United States Patent [19]
Shaffer et al.

[11] Patent Number: 5,959,662
[45] Date of Patent: Sep. 28, 1999

[54] SYSTEM AND METHOD FOR ENHANCED VIDEO CONFERENCING SECURITY

[75] Inventors: Shmuel Shaffer, Palo Alto; William Joseph Beyda, Cupertino; Eli Jacobi, Palo Alto; Vinesh R. Mehta, Mountain View, all of Calif.

[73] Assignee: Siemens Information and Communication Networks, Inc., Boca Raton, Fla.

[21] Appl. No.: 09/073,067

[22] Filed: May 4, 1998

[51] Int. Cl.[6] .................................................. H04N 7/14
[52] U.S. Cl. .................................. 348/15; 348/14; 348/17
[58] Field of Search ................................ 348/14, 15, 16, 348/17, 18, 151, 152, 154, 155, 143; 340/541, 545.1, 545.2, 545.3, 545.4, 545.5, 545.6, 545.7, 545.8, 545.9

[56] References Cited

U.S. PATENT DOCUMENTS 5,654,750  8/1997  Weil et al. ............................. 348/154
5,724,525  3/1998  Beyers, II et al. ..................... 395/240
5,745,161  4/1998  Ito ........................................... 348/15

*Primary Examiner*—Curtis A. Kuntz
*Assistant Examiner*—Melur Ramakrishnaiah

[57] ABSTRACT

A video conferencing system (10) for providing enhanced security to a conference room. A local video conferencing system (10) establishes a conference call with a remote video conferencing system. A security system within the local video conferencing system (10) monitors activity in the local video conferencing system's (10) conference room and disconnects the conference call if no activity is detected after a predetermined period of time. If activity is detected after a period of nonactivity, users of the local video conferencing system (10) are alerted that a call is in progress. The users are then given the option of continuing or disconnecting the call. In addition, the security system detects the presence of a black screen or no video signal from the remote video conferencing system and if detected, alerts the users that a call is in progress.

24 Claims, 2 Drawing Sheets ized, the video conferencing system 10 that transmits and receives telephone and video signals to and from a remote video conferencing system (not shown). The local video conferencing system 10 includes a control unit 12 that contains a central processing unit (CPU) 14 and a digital signal processor (DSP) 16 as well as numerous buttons and keys that are pressed by a user in order to
SYSTEM AND METHOD FOR ENHANCED VIDEO CONFERENCING SECURITY

FIELD OF THE INVENTION

This invention relates to video conferencing systems, and more particularly, to security measures for video conferencing systems.

BACKGROUND OF THE INVENTION

Video conferencing systems are becoming commonly used to conduct meetings between participants who are geographically separated. With a video conferencing system, an audio and video signal are transmitted over a telephonic link to be reproduced at a remote video conferencing system so that parties can see and hear each other.

Modern video conferencing systems are typically configured to "autoanswer" an incoming telephone call. Thus, if the system is turned on, it will automatically answer a call placed to a telephone number associated with the system. This allows a calling party to set-up a video conference call with a receiving party without the receiving party having to manually answer the phone. While this feature is generally a convenience, it could be used to surreptitiously monitor a video conferencing facility. For example, if a calling party knows a called party's video conference phone number, the calling party could easily place a call into the called party's conference system without their knowledge. The calling party could easily project a black image to make the other party's video monitor appear to be "off" and could also use a mute feature to prevent audio signals at the calling party's site from being transmitted to the called party. Furthermore, the calling party could use an "audio-only" feature which makes an audio connection but prevents a video connection and the mute feature to prevent "audio-only" signals at the calling party's site from being transmitted to the called party. Thus, the calling party could effectively eavesdrop on all meetings in the room that day without detection.

One approach to preventing this potential intrusion problem has been to ask that users visually check status indicator lights found on a modem of the video conferencing system at the time they enter the video conference room. However, these indicator lights are typically hidden in a cabinet that holds a monitor and the rest of the video conferencing system, thus requiring more than a mere glance at the system upon entering the room to check for any intrusions. In addition, many people simply forget to check that the video conferencing system might be on prior to beginning a meeting.

Given the ease with which security of a video conference room might be compromised, there exists a need for a video conferencing system which intelligently prevents or alerts a user to any unauthorized intrusions on a conference room.

SUMMARY OF THE INVENTION

In accordance with this invention, a video conferencing system provides security against unauthorized intrusions upon a conference room. The video conferencing system includes: a control unit for connecting a conference call between the video conferencing system and a remote video conferencing system, a video camera for recording a video and audio signal in a local video conferencing room, a video monitor for projecting a video and audio signal received from the remote video conferencing system, and a security system. The security system detects activity at a site of the local video conferencing system. The security system disconnects the conference call if no activity is detected at the site of the local video conferencing system after a predetermined period of time. In addition, the security system alerts a user of the local video conferencing system that a call is in progress if activity is detected after a prior predetermined period of inactivity since the time when the connection of the conference call was made or if activity is detected in the local video conferencing site and a black screen is detected at the remote video conferencing site.

The activity monitored in the local video conferencing room can be sound, movement or both. Thus, if only sound is being monitored, for example, the video conferencing system will disconnect the conference call after detecting a predetermined period of silence in the local video conferencing room. In addition, depending upon the type of activity being monitored, the type of alert given by the video conferencing system, if necessary, can vary. For example, an alert message can be visually displayed on the video monitor of the local video conferencing room. In this respect, the alert message could also be flashed periodically on the video monitor for a predetermined period of time. Alternatively, the alert could be an audio alarm.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a video conferencing system that employs a security system for preventing unauthorized intrusions upon a conference room. As will be explained in detail below, the video conferencing system monitors activity in a conference room in which it is located and disconnects conference calls after a predetermined period of inactivity. Therefore, the inherent security risk associated with an outside caller attempting to call into the video conferencing system and eavesdrop upon conversations taking place in the conference room is substantially reduced, if not eliminated. In addition, the video conferencing system alerts users of the system that a call is in progress if activity is detected after a predetermined period of inactivity or after a black screen that is being transmitted from a remote video conferencing system is detected. Finally, the video conferencing system of the present invention continually monitors the activity in a conference room, even when a call is acceptable, and disconnects the call after a predetermined period of inactivity to reduce the cost associated with a conference call that was improperly terminated.

Figure 1:
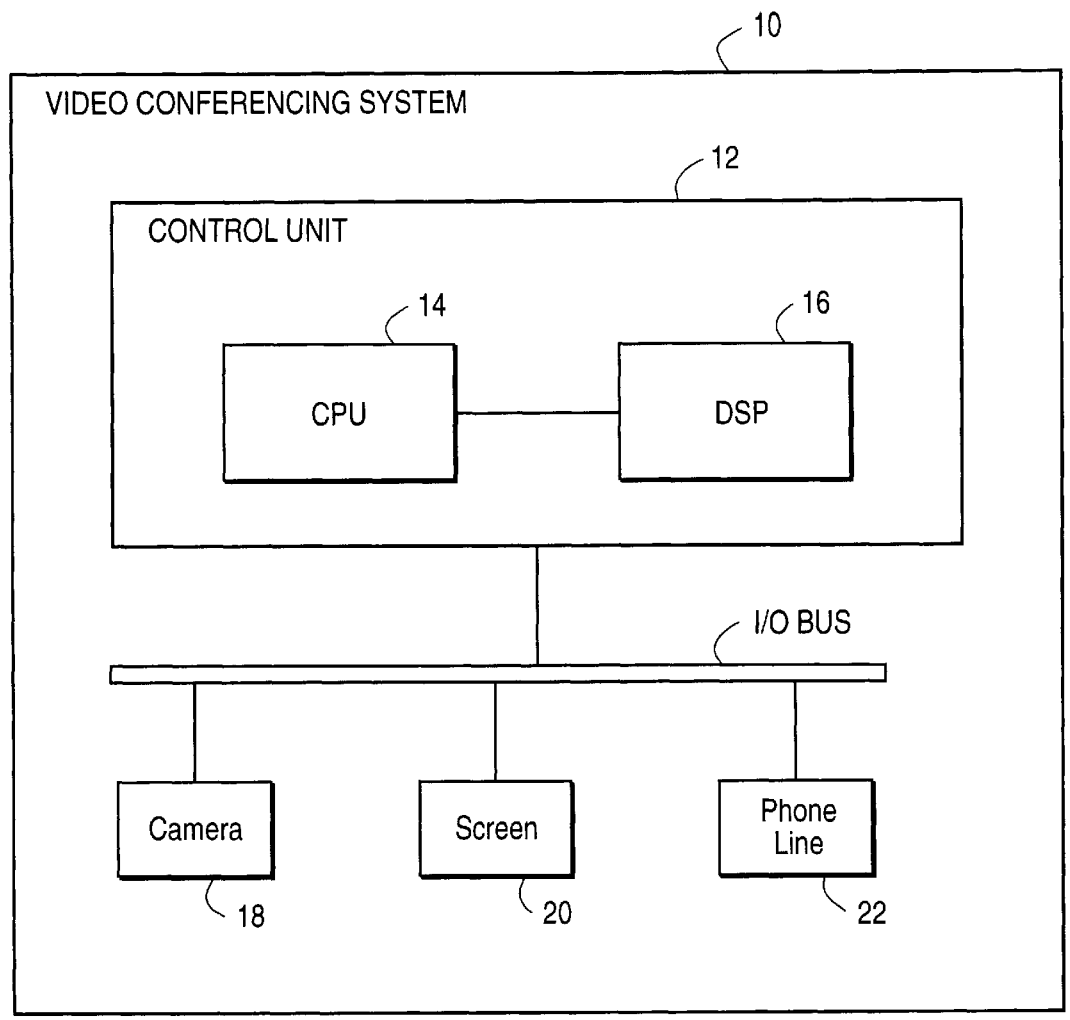
FIG. 1 is a functional block diagram that illustrates a video conferencing system formed in accordance with this invention.

FIG. 1 illustrates a local video conferencing system 10 that transmits and receives telephone and video signals to and from a remote video conferencing system (not shown). The local video conferencing system 10 includes a control unit 12 that contains a central processing unit (CPU) 14 and a digital signal processor (DSP) 16 as well as numerous buttons and keys that are pressed by a user in order to operate the local video conferencing system 10. Generally, the CPU 14 is responsible for setting up conference calls and the DSP 16 is responsible for making analog to digital or digital to analog data conversions of the audio and video signals transmitted between the local and remote video conferencing systems. The control unit 12 sends and receives signals to and from a video camera 18, a video monitor 20 and a phone line 22. The video camera 18 has a microphone and records both visual and audio activity in a conference room in which the local video conferencing system 10 is located, while the video monitor 20 reproduces the video and audio signals received from the remote video conferencing system.

As will be better understood from the following description, the video conferencing system 10 of the present invention includes a security system that provides security against unauthorized intrusions into its conference room by monitoring both the activity, i.e. the movement, sound or both, within the conference room and the periods of inactivity during which no sound or movement in the conference room is detected. In addition, the security system determines whether a black screen is being projected onto the video monitor 20. In particular, once a connection is made between the local video conferencing system 10 and a remote video conferencing system, the local video conferencing system 10 uses a monitor, preferably the video camera 18 and its microphone, to monitor any activity in its conference room. The DSP 16 within the control unit 12 monitors the audio level produced by the microphone and compares the level to a threshold. If the audio level exceeds the threshold more than a predetermined number of times in a fixed time interval, then the DSP 16 assumes that there is activity in the conference room.

Furthermore, preferably, the DSP 16 within the control unit 12 continually monitors movement in its conference room by detecting differences in each frame of video data recorded by the video camera 18. Alternatively, movement in the conference room could be monitored by a motion sensor. Besides detecting activity in the conference room, the local video conferencing system 10 also detects whether a black screen in being projected onto the video monitor 20. Preferably, the DSP 16 within the control unit 12 monitors for a black screen by analyzing the video data received from the remote video conferencing system for the presence of all black video signals.

Figure 2:
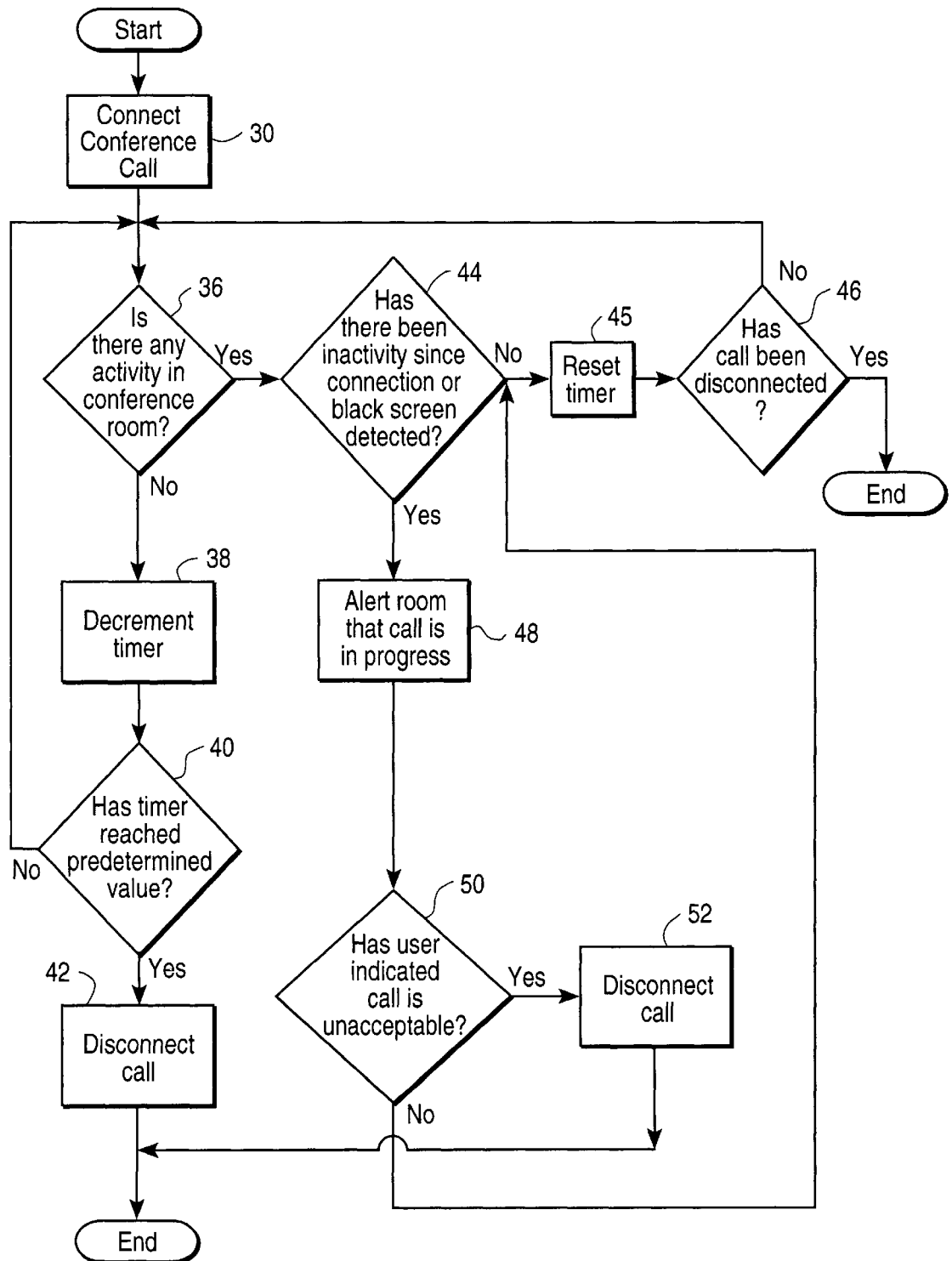
FIG. 2 is a functional flow diagram that illustrates the operation of the video conferencing system depicted in FIG. 1 to prevent the unauthorized monitoring of a video conference room.

FIG. 2 is a flow chart that illustrates the steps performed by the present invention to prevent the unauthorized monitoring of a video conference room. As discussed above, there are generally two scenarios in which an unauthorized caller could surreptitiously monitor conversations in a video conferencing room. First, an unauthorized caller places a call to the local video conferencing system and the call is automatically answered. Then, the unauthorized caller places a hood over or a black board in front of their video camera so that the video monitor 20 at the local video conferencing system 10 appears to be switched off, producing a "black screen" on the video monitor of the local video conferencing system. If an audio-only feature is selected at the remote video conferencing system, the unauthorized caller effectively prevents a visual connection and eavesdrops via only a listening device, such as a microphone. Alternatively, a spy within the company may place a call to the remote video conferencing system while no one is in the video conferencing room and leave the call connected until the meeting to be observed is over. The call placed by the spy need not be to a video conferencing system but could be any telephone system. Similarly as above, the spy within the company could set up an audio-only call or an audio and visual call.

Beginning with a step 30, a conference call is connected between the local video conferencing system 10 and a remote video conferencing system. This connection can be initiated by a user of either the local video conferencing system 10 or the remote video conferencing system. If initiated by a user of the remote video conferencing system, the call can be either manually answered and accepted or autoanswered by the local video conferencing system 10 after a predetermined number of rings.

Then, at a step 36, a test is made to determine whether there is any activity in the conference room of the local video conferencing system 10. If there is no activity in its conference room, the local video conferencing system 10 decrements a timer at step 38. Alternatively, the timer could be incremented if desired. Regardless of whether the timer is decremented or incremented, the time period of each decrement or increment is regular. Thereafter, the local video conferencing system 10 determines at a step 40 whether the timer has reached a predetermined value. If it has reached the predetermined value, for example five minutes without activity in the room, the local video conferencing system 10 disconnects the conference call at a step 42. If the timer has not reached the predetermined value, processing returns to step 36 and the steps described above are repeated.

If the answer to step 36 is yes, and the local video conferencing system 10 determines that there is activity in its conference room, a test is made at a step 44 to determine either whether there has been a predetermined period of inactivity since the connection of the conference call or whether there is a black screen detected. The local video conferencing system 10 determines whether there has been a predetermined period of inactivity by evaluating the timer. If the timer has reached a predetermined value which is associated with a threshold unacceptable period of inactivity, then the local video conferencing system 10 will answer yes to step 44. The predetermined value of the timer for testing inactivity at step 44 is preferably a fraction of the predetermined value of the timer that is used to test whether the call should be disconnected at step 40. In addition, the security system determines whether the remote video conferencing system is sending a black video signal. It will be appreciated that, alternatively, in order to prevent the situation in which a caller connects with the local video conferencing system 10 immediately before a conference is to take place in the video conferencing room, the threshold unacceptable period of inactivity could be lowered or the local video conferencing system 10 could alert the user of its conference room once that a call is in progress after it detects activity in the conference room.

If the answer to step 44 is no, and the local video conferencing system 10 determines that the predetermined period of inactivity has not elapsed, thus indicating the conference call was most likely acceptable, and that a black screen was not detected, then the timer is reset at a step 45 and a test is made at a step 46 to determine whether the conference call has been disconnected. If the conference call has been disconnected, the local video conferencing system need not perform any further functions and processing ends. However, if the conference call has not been disconnected, processing returns to step 36 and the steps described above are repeated. By repeating these steps, the local video conferencing system 10 effectively prevents either party from failing to disconnect after a conference call has ended and the participants have left the conference room since the security system will automatically disconnect after a predetermined period of inactivity.

If the answer to step 44 is yes, and the local video conferencing system 10 determines either that there has been a predetermined period of inactivity since the time at which connection of the conference call was made or that a black screen is detected, the local video conferencing system 10 alerts the occupants of the conference room that a call is in progress at a step 48. This alert can be visually flashed or continually displayed on video monitor 20 with a message such as "Call in Progress" or "Black Screen Detected." The visual alert message could remain on the screen indefinitely or terminate after a predetermined period of time. Alternatively, the local video conferencing system can sound an alarm "beep" or some other audio alert message. After being alerted, if the user of the conference room of the local video conferencing system 10 indicates that the call is not acceptable, then the local video conferencing system 10 disconnects the conference call as shown at a step 50 and a step 52. Preferably, the user indicates that a call is unacceptable by manually disconnecting the conference call. On the other hand, if the user indicates at step 50 that the call is acceptable, processing returns to step 45 and the steps described above are repeated. By returning to step 45, the local video conferencing system 10 effectively prevents against a failure to disconnect by either party to the conference call. Furthermore, by returning to step 45, the local video conferencing system 10 can potentially alert the user of its conference room more than once. However, it will also be appreciated by those skilled in the art and others that the local video conferencing system 10 could be made to alert the user of the system only once that a call is in progress.

As will be readily appreciated by those skilled in the art and others, a video conferencing system formed in accordance with the invention, has a number of advantages. First, by disconnecting conference calls after a predetermined period of inactivity, the video conferencing system not only reduces the security risk of an outside caller connecting to the video conferencing system long before the conferencing room is occupied but it also reduces the cost of a conference call in which either party failed to disconnect. The video conferencing system further reduces the security risk inherent within such a system by alerting a user of the conference room that a call is in progress.

The embodiments of the invention in which an exclusive property or privilege is claimed are defined as follows:

1. A video conferencing system comprising:
   a control unit that connects conference calls between the video conferencing system that is located in a local video conference room and a remote video conferencing system located in a remote video conference room;
   a sensor that detects activity in said local video conference room;
   a video monitor that displays activity occurring in said remote video conference room within said local video conference room; and
   a security system for preventing unauthorized access to said local video conference room, wherein said security system determines activity in said local video conference room based on signals from the sensor and disconnects a previously established conference call if there is no activity detected in said local video conference room after a predetermined period of time.

2. The video conferencing system of claim 1, wherein the security system further determines whether there was a period of inactivity in the local video conference room since a time when the conference call was connected and, if so, provides an alert that a conference call is in progress.

3. The video conferencing system of claim 2, wherein said alert is a visual display on said video monitor.

4. The video conferencing system of claim 3, wherein the alert is flashed periodically on said video monitor for a predetermined period of time.

5. The video conferencing system of claim 2, wherein said alert is an audio alert.

6. The video conferencing system of claim 1, wherein said security system further determines whether a black screen is being projected onto said video monitor by said remote video conferencing system and, if so, produces an alert that a conference call is in progress.

7. A method of preventing unauthorized monitoring of a local video conference room in which a local video conferencing system is located, said method comprising:
   connecting a conference call between said local video conferencing system and a remote video conferencing system;
   detecting activity in said local video conference room; and
   disconnecting said conference call if there is no activity detected in said local video conference room within a predetermined period of time to prevent unauthorized monitoring of said local video conference room.

8. The method of claim 7 further comprising:
   providing an alert if activity is detected in said local video conference room and a prior period of inactivity has been detected since the connection of the conference call.

9. The method of claim 7 further comprising:
   detecting whether a black screen is projected onto a video monitor of said local video conferencing system in said local video conference room by a user of said remote video conferencing system; and
   providing an alert when activity is detected in said local video conference room and said black screen is detected.

10. The method of claim 8, wherein the alert is provided by visually displaying an alert message on a video monitor of said local video conferencing system.

11. The method of claim 10, wherein said alert is provided by periodically flashing the alert on the video monitor.

12. The method of claim 8, wherein said alert is provided by producing an audio alert indicating that a conference call is in progress.

13. A video conferencing system comprising:
   a control unit that connects a conference call between the video conferencing system that is located in a local video conference room and a remote video conferencing system located in a remote video conference room;
   a monitor that detects activity in said local video conference room;
   a video monitor that displays activity occurring in said remote video conference room within said local video conference room; and
   a security system determines whether there was a period of inactivity in the local video conference room since a time when the conference call was connected based on signals from the monitor and, if so, provides an alert that a conference call is in progress, wherein the security system further disconnects said conference call if there is no activity detected in said local video conference room after a predetermined period of time.

14. The video conferencing system wherein claim 13, wherein said alert is a visual display on said video monitor.

15. The video conferencing system of claim 14, wherein the alert is flashed periodically on said video monitor for a predetermined period of time.

16. The video conferencing system of claim 13, wherein said alert is an audio alert.

17. The video conferencing system of claim 13, wherein said monitor is a video camera having a microphone.

18. The video conferencing system of claim 13, wherein said monitor is a motion sensor.

19. A method of preventing unauthorized monitoring of a local video conference room in which a local video conferencing system is located, said method comprising:

connecting a conference call between said local video conferencing system and a remote telephone system;

detecting activity in said local video conference room;

disconnecting said conference call if there is no activity detected in said local video conference room within a predetermined period of time; and providing an alert if activity is detected in said local video conference room and a prior period of inactivity is detected since the connection of the conference call.

20. The method of claim 19, wherein the alert is provided by visually displaying an alert message on a video monitor of said local video conferencing system.

21. The method of claim 20, wherein said alert is provided by periodically flashing the alert on the video monitor.

22. The method of claim 19, wherein said alert is provided by producing an audio alert indicating that a conference call is in progress.

23. A video conferencing system comprising:

a control unit that connects a conference call between the video conferencing system that is located in a local video conference room and a remote video conferencing system located in a remote video conference room;

a monitor that detects activity in said local video conference room;

a video monitor that displays activity from said remote video conference room within said local video conference room;

a security system that determines whether a black screen is being projected onto said video monitor by said remote video conferencing system and, if so, producing an alert that a conference call is in progress, wherein the security system further disconnects said conference call if there is no activity detected in said local video conference room after a predetermined period of time.

24. A method of preventing unauthorized monitoring of a local video conference room in which a local video conferencing system is located, said method comprising:

connecting a conference call between said local video conferencing system and a remote video conferencing system;

detecting activity in said local video conference room;

disconnecting said conference call if there is no activity detected in said local video conference room within a predetermined period of time;

detecting whether a black screen is projected onto a video monitor of said local video conferencing system in said local video conference room by a user of said remote video conferencing system; and providing an alert in the local video conference room when activity is detected in said local video conference room and said black screen is detected.

* * * * *